July 21, 1959 J. R. BAILEY 2,895,707
VALVE CONSTRUCTION
Filed Sept. 14, 1953 4 Sheets-Sheet 1
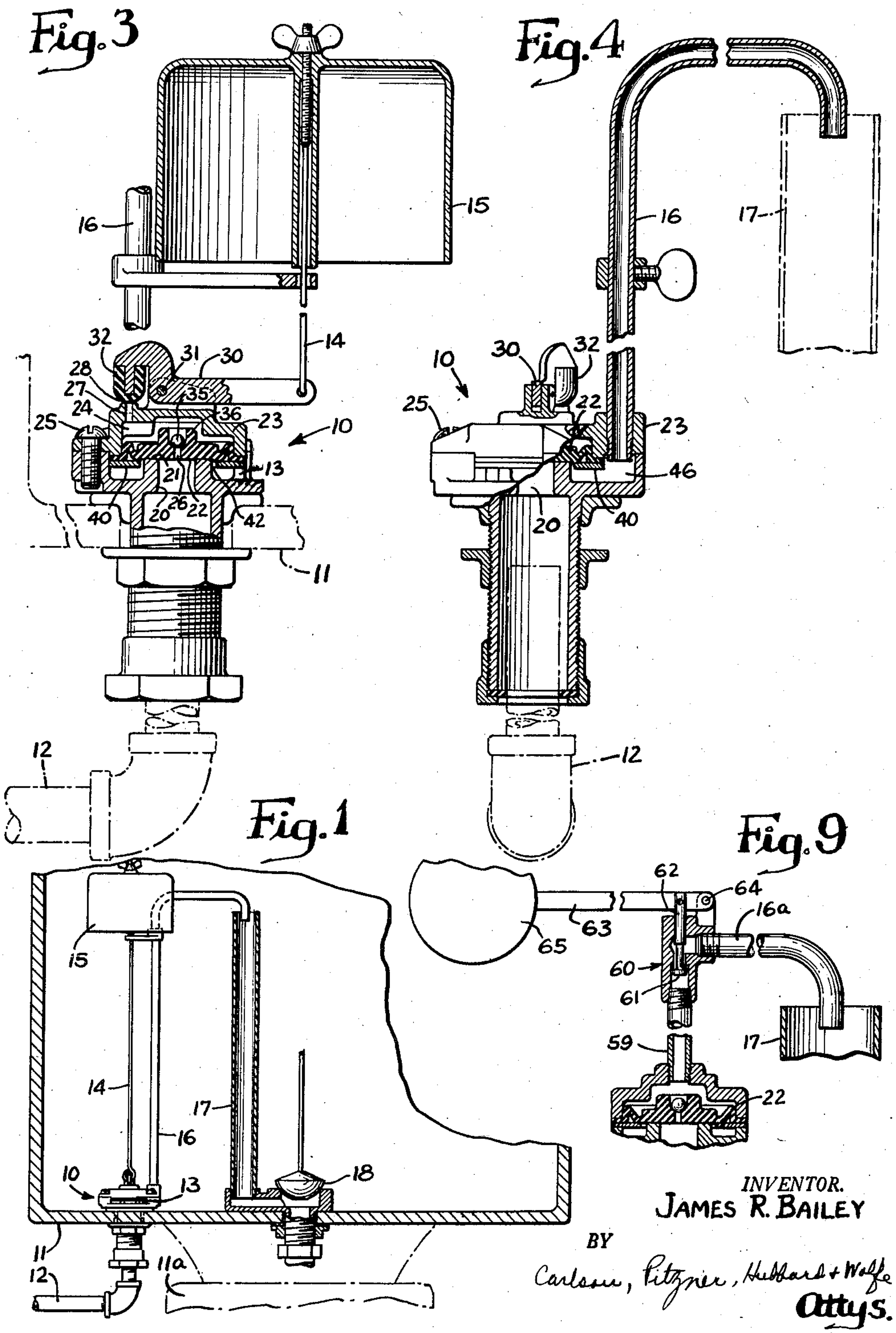
INVENTOR.
JAMES R. BAILEY
BY
Carlson, Pitzner, Hubbard + Wolfe
Attys.

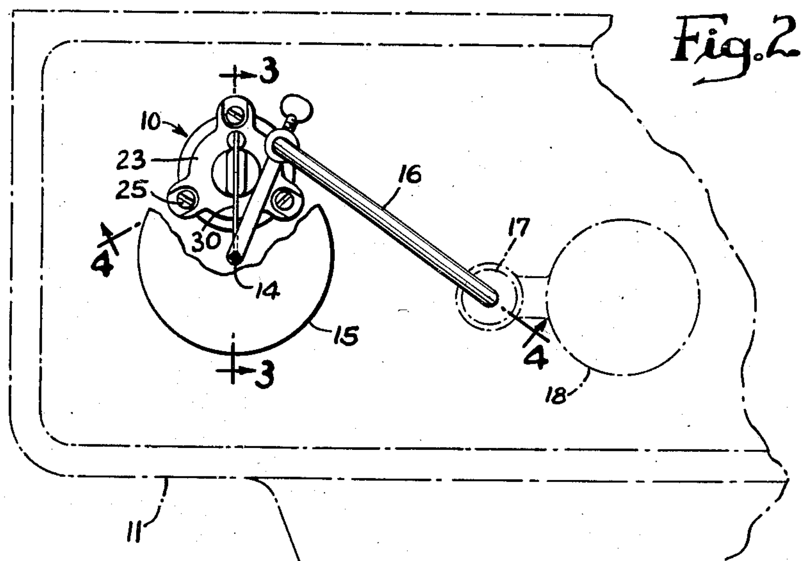
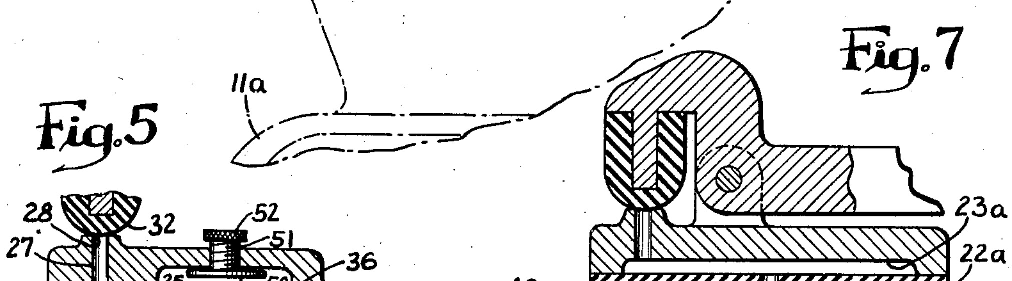
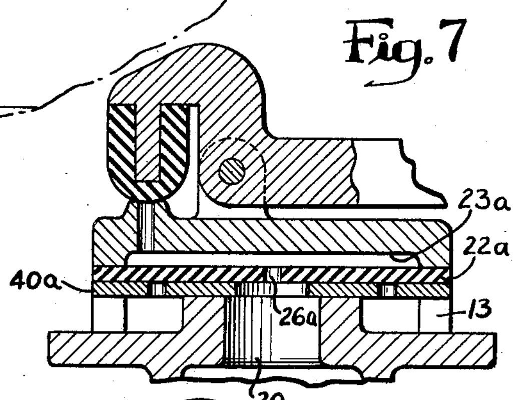
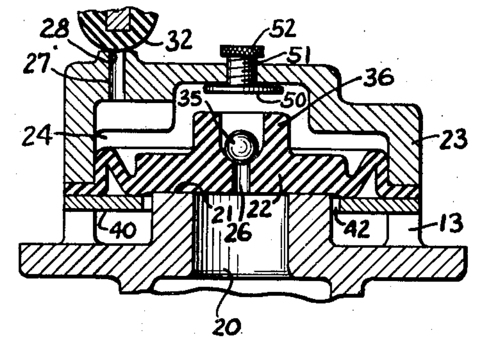
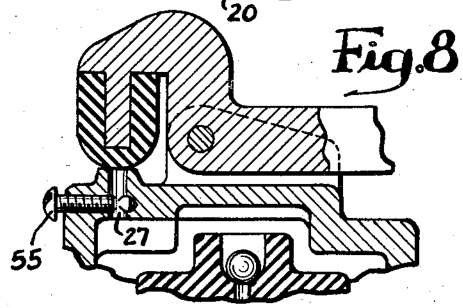
Fig.6
28
27
23
40a
41c
41b
41a
22
41a
13
20
INVENTOR.
JAMES R. BAILEY
BY
Carlson, Pitzner, Hubbard & Wolfe
Attys.

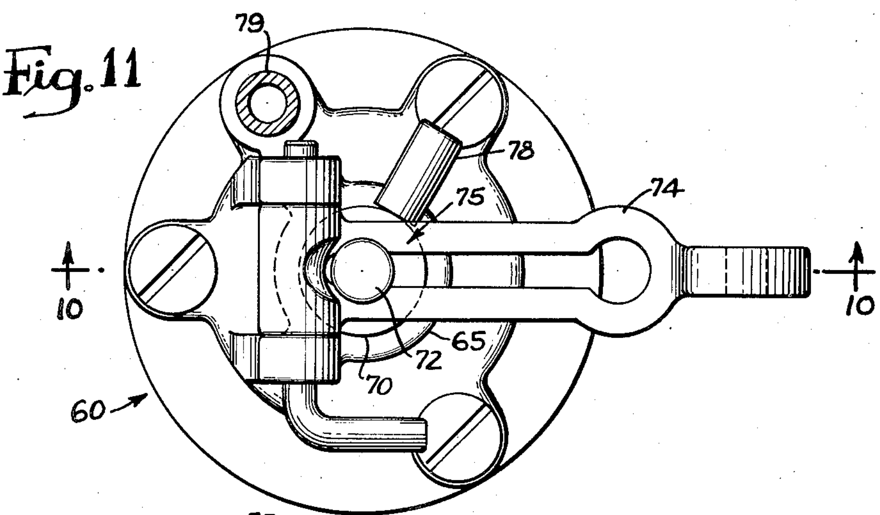
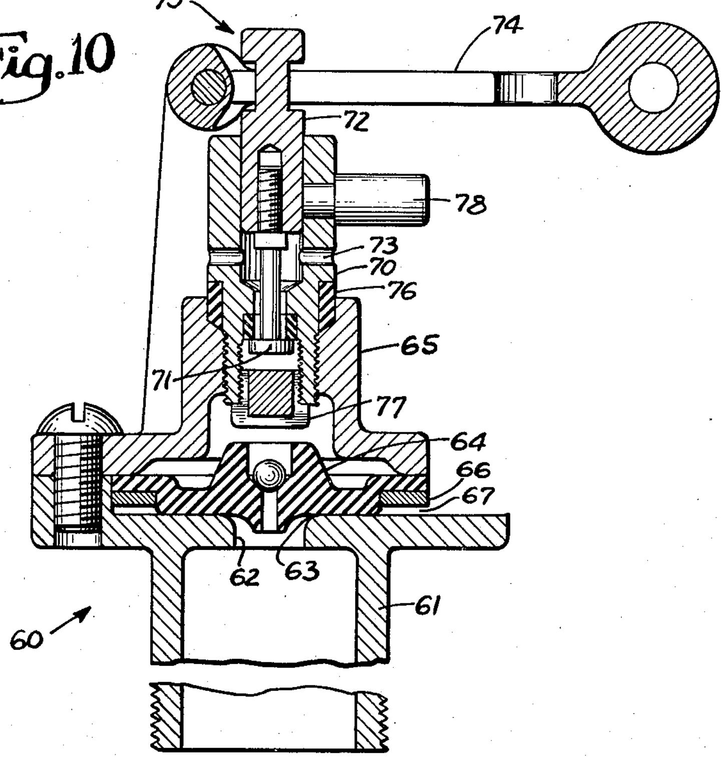
INVENTOR.
JAMES R. BAILEY
BY
Carlson, Pitzner, Hubbard & Wolfe
Attys.

July 21, 1959 J. R. BAILEY 2,895,707
VALVE CONSTRUCTION
Filed Sept. 14, 1953
4 Sheets-Sheet 4
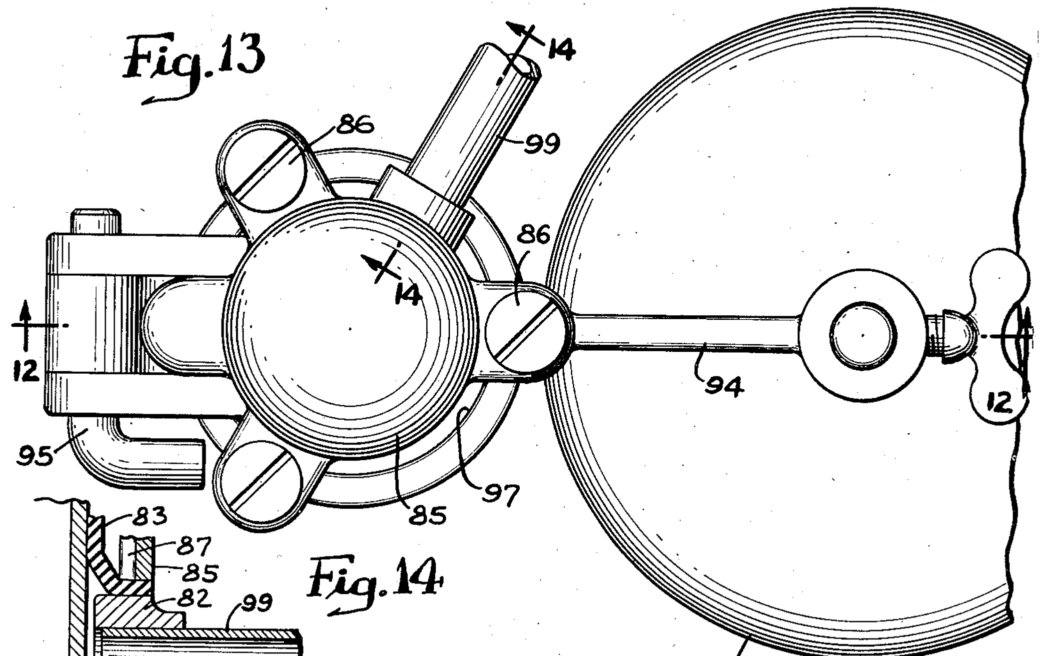
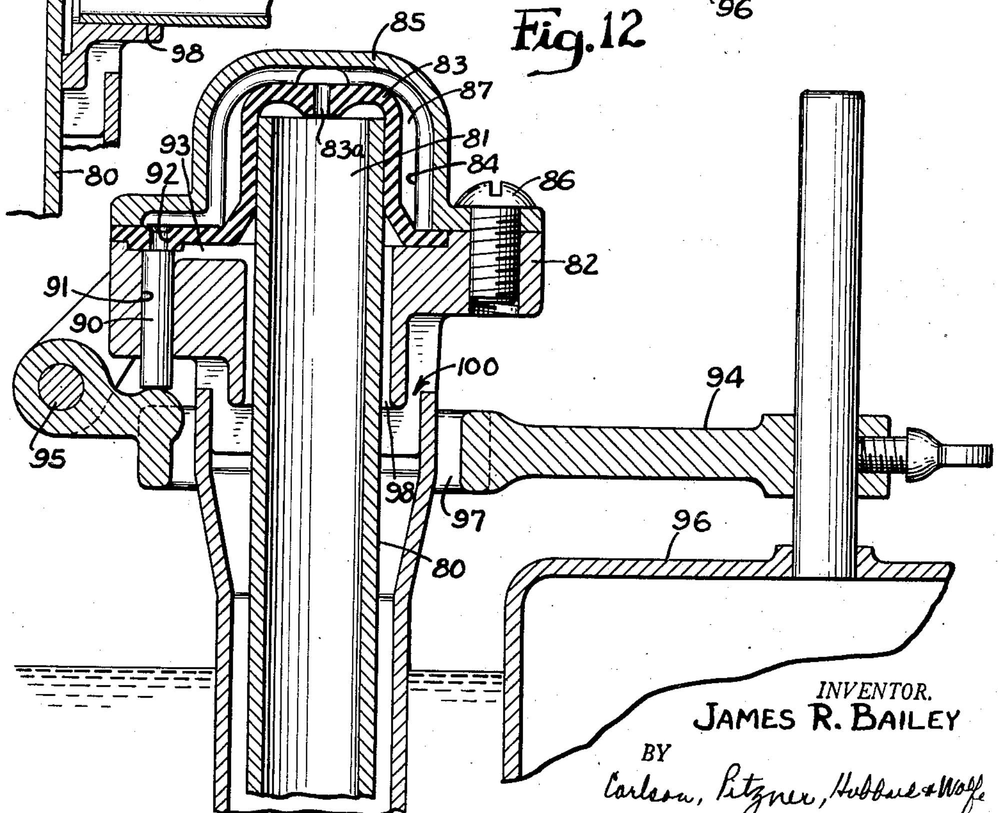
INVENTOR.
JAMES R. BAILEY
BY
Carlson, Pitzner, Hubbard & Wolfe
Attys.

United States Patent Office 2,895,707

Patented July 21, 1959

2,895,707

VALVE CONSTRUCTION

James R. Bailey, Chicago, Ill., assignor of thirty percent to Robert J. Bailey, Chicago, Ill.

Application September 14, 1953, Serial No. 379,887

2 Claims. (Cl. 251—46)

The present invention relates to valves, and more particularly to a valve having a triggered release member for controlling the flow of fluids under pressure.

It is the primary object of the present invention to provide an improved valve which is efficient and absolutely reliable. It is another object to provide an improved valve for controlling the flow of fluids which avoids the throttling discharge characteristic of conventional valves and which permits rapid flow with a minimum of "rushing" noise. It is a further object to provide a valve for refilling a water tank or the like in which "recovery time" is minimized. It is a further object to provide an improved valve which has a high discharge rate, opening and closing with a positive action, but in which snap action or hammering at the main valve seat is completely avoided.

It is an object of the present invention to provide a valve of high flow capacity but which nevertheless requires only small operating pressures. It is another object of the invention to provide a valve which eliminates the use of compound linkages and which may be operated in a water closet or the like simply by a float and single pivoted lever. It is a further object of the invention to provide an improved valve which is simple and straightforward of construction and which may be manufactured at a cost which is much less than that of valves intended for comparable purposes. It is still another object of the invention to provide a valve which is substantially maintenance-free and which may be operated over long periods of time without interruption of service.

It is a more detailed object of the invention to provide a liquid control valve which has a novel anti-syphon feature. It is a still further object to provide a valve in which the operating and flow characteristics may be varied over relatively wide limits, in order to adapt the valve for specialized control applications. Other objects and advantages of the invention will become apparent upon reading the attached description taken in connection with the drawings, in which Figure 1 shows the external appearance of the valve incorporating the present invention as mounted in a water closet.

Fig. 2 is a top view of the valve arrangement shown in Fig. 1.

Fig. 3 is a section taken along the line 3—3 of Fig. 2.

Fig. 4 is a fragmentary section showing the connection between the valve body and the refill tube and taken along the line 4—4 of Fig. 2.

Fig. 5 is a fragmentary section showing means for adjusting the excursion of the diaphragm.

Fig. 6 is a fragmentary section showing a modified structure employed for controlling the flow characteristics.

Fig. 7 shows a further modification of the present valve employing a flat rubber diaphragm.

Fig. 8 is a fragmentary section showing means for controlling fluid flow through the pilot valve orifice.

Fig. 9 shows a further modification in which the refill tube is connected to the outlet of the pilot valve.

Fig. 10 is a vertical section of a modified form of the present invention taken along the line 10—10 in Fig. 11.

Fig. 11 is a top view of the device shown in Fig. 10.

Fig. 12 is a vertical section of still another modification of the present invention.

Fig. 13 is a top view of the arrangement shown in Fig 12.

Fig. 14 is a fragmentary section taken along the line 14—14 in Fig. 12.

While the invention has been described in connection with certain preferred embodiments, it will be understood that I do not intend to limit the invention to such embodiments, but intend to cover all modifications and alternative constructions and uses falling within the spirit and scope of the appended claims.

The valve to be described has general utility wherever it is desired to provide "on-off" fluid control using only small control pressures, and where fluid must flow at a high rate when the valve is in its "on" condition. The valve structure to be described provides numerous advantages, making the valve suitable for use in many different applications. For the purpose of explaining a number of such advantages, the valve will be described in connection with its use in a water closet.

Turning now to Figures 1 and 2, the valve indicated generally at 10 is mounted in a tank 11 having a bowl 11*a* and connected to a water supply 12. The valve has outlet orifices 13 and flow is controlled by means of a rod 14 and float 15, upward pull on the rod being effective to produce shut-off. Extending upwardly from the valve body is a refill tube 16, which discharges into a tank overflow tube 17. The tank is discharged by a conventional flush valve 18.

In order to understand the internal construction of the valve 10, reference is next made to Fig. 3, which shows the valve mechanism in cross section. Here it will be noted that the supply line 12 terminates in a throat 20 provided with an annular valve seat 21. Seated on the valve seat is a diaphragm 22 which is preferably constructed of tough resilient material having the characteristics of rubber or artificial rubber. The diaphragm 22 is engaged about its periphery by a valve cap 23 refining an upper or pressure chamber 24. The valve cap is firmly clamped to the main body portion of the valve by means of suitable bolts 25.

In practicing the invention, the diaphragm 22 is provided with a central pressure-transmitting opening 26 of relatively narrow diameter, which permits pressure communication from the water supply line 12 to the upper chamber 24. Furthermore, the valve cap 23 is provided with a pilot valve passage 27, having a pilot valve seat 28. For the purpose of normally closing the pilot valve passage 27, a pilot valve member 30 is provided. In the present instance the pilot valve member 30 takes the form of a lever of the first class pivoted at 31 and having a button-like tip 32 of resilient material. As long as upward tension is maintained by the float, the valve seat 28 remains sealed.

It is one of the more detailed features of the present invention that a ball check valve 35 is provided for normally seating the central opening 26 in the boss 36 of diaphragm 22. The ball is held captive above the opening 26 by an integrally formed boss 36. The check valve provides anti-syphon action, preventing reverse flow of water from the tank 11 upon failure of pressure in the water supply line 12, as will be covered more fully in the discussion which follows.

While the operation of the valve as thus far described will be largely apparent to one skilled in this art, it will be helpful to review the operation briefly. It will be assumed at the outset that the tank 11 is filled and that the float 15 exerts torque on the pilot valve member 30, thereby sealing off the pilot valve seat 28. Under such conditions, the diaphragm 22 is firmly seated on its seat 21, being held in place by water pressure, the greater the pressure the tighter the seal.

Upon lowering of the water level in the tank 11, as caused, for example, by operation of the flush valve 18, the float 15 drops, uncovering the pilot valve passage 27. This relieves the pressure in the chamber 24 and the valve diaphragm is forcibly moved into its upper or open position by the pressure of water below it. Such water then passes by the valve seat 21 and escapes into the tank through the orifices 13. Flow continues as long as pressure above the diaphragm is relieved. However, as the tank becomes filled, the upward force of the float causes the pilot valve passage to be shut off so that pressure is built up in the upper chamber 24. Such build-up occurs quite rapidly, so that within a short time, usually much less than a second, the diaphragm moves back into its closed position. As the diaphragm begins to seat on its valve seat 21, the effective area on the underside of the diaphragm is sharply reduced and final closing takes place promptly and positively, with substantially no throttling effect. As a result, the noise usually associated with valves of this character is largely eliminated.

Where it is desired to limit the abruptness of the closing, the flow of water over the valve seat 21 may be limited by providing a restriction between the seat and the discharge orifice. This is preferably accomplished by use of an annular collar 40, as shown in Fig. 3. Such collar is mounted so as to bear flatly against the diaphragm when the latter is in its closed position, and has a relatively large opening at its center, providing an annular escape passage 42 for the discharged water. In the preferred embodiment illustated in the drawings, the area of the escape passage 42 is approximately the same as the area of the throat 20, so that the flow is not constricted to any substantial degree. It has been found that the presence of the collar 40, arranged as described, reduces the abruptness of the action of the diaphragm and tends to eliminate any tendency toward thumping or vibration which might be encountered where there is impositive or tentative operation of the pilot valve resulting from turbulence in the tank.

For the purpose of refilling the bowl **11*a*, the refill tube 16 is provided which is connected to the valve cap as shown in Fig. 4. The bottom of the tube is connected at a region 46 adjacent the main valve seat 21, yet spaced from the outlet orifice 13. For convenience, this point of connection may be referred to as an outlet chamber. It will be apparent that during the refilling of the tank, sufficient water pressure will be available at the region 46 so as to cause discharge of a certain amount of water through the tube 16 and into the overflow tube 17**. Such discharge is sufficient to refill the bowl and any excess is automatically drained off through the bowl trap in the usual fashion.

Where it is desired to control the rate of flow of the output, means may be provided for limiting the upward movement of the diaphragm 22. This is shown in Fig. 5. Here a stop plate 50 is mounted at the end of an adjusting screw 51 which may be turned by means of a suitable handle 52. It is found that such arrangement enables maximum flow to be adjusted with precision over a wide range.

If desired, maximum flow may also be reduced by means of a modified construction which includes a specially constructed annular member indicated at **40*a* in Fig. 6. The annular member 40*a* has a relatively narrow central opening 41*a*, which overlies the throat 20 of the supply pipe and which is sealed in place at 41*b* by brazing or the like. Discharge occurs through openings 41*c*. In this modification almost the entire upper portion of the annular member is in contact with the diaphragm 22 to form the valve seat. The advantage of this arrangement is two-fold. In the first place, substantially the same valve body may be employed as used in Fig. 1, an annular member 40*a* being selected which has a central opening 41*a*** of the desired diameter and flow characteristics. In addition, the seating area engaged by the diaphragm is greatly in excess of that shown in the embodiment previously described, so that the arrangement is particularly suitable where long life and freedom from wear are paramount considerations.

While the invention has been described in connection with a molded diaphragm, it will be apparent to one skilled in the art that the invention is not limited thereto but includes use of a flat rubber diaphragm, for example, as shown at **22*a* in Fig. 7 and having a central opening 26*a*. The flat rubber diaphragm lies flatly against the annular member 40*a* under normal conditions. Opposite the diaphragm a flat surface 23*a* is provided on the valve cap which serves as a backstop for the diaphragm when the valve is opened. It will be noted that the valve structure shown in Fig. 7 does not included the ball check valve 35 employed in the previous embodiment. However, the total force against the upper side of diaphragm 22*a* is greater than the total force against that portion of the underside thereof against annular member 40*a*, and the differential force against diaphragm 22*a* causes the same to be urged against the annular member 40*a***. The operation cycle, however, is the same as in the embodiments previously described.

In certain valve applications it may be desired to decrease the rate of pilot valve response. To accomplish this an adjustment is provided as shown in the fragmentary section of Fig. 8. The adjustment may be in the form of a screw 55 which is threaded into the valve cap so as to intersect the pilot valve passage 27. Thus, the effective area of the pilot valve passage may be varied over wide limits, maximum delay being achieved when the area of the pilot valve passage 27 is minimum.

In the previously described embodiments, a portion of the main flow is diverted through the refill tube 16. However, if desired, the liquid escaping from the pilot valve may be used for refilling purposes. This is accomplished as shown in Fig. 9. Here a vertical pilot valve tube 59 is provided having a pilot valve 60 at its upper end. The valve includes a pilot valve member 61, the space above the valve member being connected to a refill tube **16*a*. The member 61 is connected to a plunger 62, which is operated by a float lever 63. The float lever is pivoted at 64 and carries a float 65 at its opposite end. The operation of the pilot valve shown in Fig. 9 will be apparent to one skilled in the art. When the level of the water in the tank is lowered by operation of the flush valve, the float swings downwardly, operating the plunger 62 and unseating the valve. This relieves pressure from the space above the diaphragm 22, and the valve cycle occurs as described above. During the period when the tank is refilling, the water passing through the unseated valve is fed into the refill pipe 16*a* to fill the bowl 11*a***.

While the ball check valve 35 in the diaphragm is not essential to the operation of the main valve, it has proved to be a worthwhile feature. Tests have been made using metal and plastic balls of about ⅛" in diameter covering a pressure-transmitting opening of about 1/16" diameter. Syphoning of water from the tank back into the supply line upon failure of pressure therein was found to be positively prevented.

It will be apparent to one skilled in the art that the structural features described above are not limited to the specific construction shown in Figs. 1–9, inclusive, but are applicable to modified structures, one such modification being shown in Figs. 10 and 11. In these figures the valve, indicated generally at 60, has a supply line 61 terminating in a throat 62 surrounded by an annular valve seat 63. Cooperating with the valve seat 63 is a diaphragm 64, which is engaged about its periphery by a valve cap 65. The diaphragm is held into contact with the valve cap by an annular ring 66, which defines an outlet orifice 67. This arrangement has the advantage that the water escaping through the valve is not required to undergo several sharp bends, as in the case of the structure described above, and consequently the action of the valve is quieter than that previously described.

Continuing the discussion of the device shown in Figs. 10 and 11, a pilot valve tube 70 is threaded into the center of the cap 65. Such pilot valve tube includes a pilot valve 71 and a pilot valve stem 72. The space above the pilot valve is vented through openings 73. The valve stem 72 has, in accordance with one of the more detailed aspects of the invention, a lost-motion connection with a float lever 74, such lost-motion connection being indicated at 75. The advantage of the lost-motion connection is that final closing movement of the valve stem may take place freely, with a snap action and without corresponding movement of the float lever 74. The operation of the device thus far described is as follows: Lowering of the level of the water in the tank due to flushing causes the float lever 74 to drop, unseating the pilot valve 71. This causes the space above the diaphragm to be vented and the pressure of the water in the supply line causes prompt lifting of the diaphragm, resulting in escape of water through the outlet 67 into the tank. Such escape occurs quietly and with little turbulence. As the water level rises, the float lever is swung upwardly, which causes gradual closure of the pilot valve 71. The throttling through the pilot valve which is incident to such gradual closure results in a build-up of pressure in the space above the diaphragm. Such pressure, acting upon the pilot valve 71, causes the valve to be moved upwardly with a snap action into the fully closed position and without corresponding movement of the float or float lever.

It is one of the more detailed features of the device shown in Figs. 10 and 11 that the pilot valve tube 70 may be bodily screwed into and out of the valve cap 65 to vary the excursion of the diaphragm 64. Such movement is permitted by providing resilient packing 76 between the pilot valve tube and the valve cap and by providing an abutment 77 at the lower end of the valve tube and in the path of movement of the diaphragm. To turn the valve tube, the same is equipped with a handle 78. It will be apparent that clockwise rotation of the valve tube moves the abutment 77 closer to the diaphragm, thereby limiting the discharge of water from the supply line. Conversely, unscrewing the pilot valve tube causes the abutment 77 to be backed off, thereby increasing the maximum discharge. The advantages of such adjustment have been previously spelled out in connection with Fig. 5. In order to refill the closet, a closet refill tube 79 is provided which communicates with the outlet orifice 67 and in which flow is induced because of the back pressure of the water escaping through the orifice 67 into the tank, exactly as in the case of the tube 16 in Fig. 4.

A still further modification of the present invention including some of the same basic features of construction, is set forth in Figs. 12–14. The valve arrangement shown in these figures differs from that previously described in that it incorporates an air lock to prevent syphoning, rather than a ball-check. The valve mechanism is positioned above the maximum water level, as shown in Fig. 12. Extending upwardly from the bottom of the tank is a supply line 80 having a throat 81. Surrounding the throat 81 is a valve frame 82. Mounted in the valve frame 82 is a rubber diaphragm 83, which differs from the diaphragm as described above in that it is in the form of a rubber sock which snugly embraces the outer walls of the supply line 80 at its upper end. In order to secure the diaphragm 83 in place, a cap member 85 is provided which is held in place by suitable bolts 86. This cap member defines a pressure space 87 above the diaphragm 83 and is preferably provided with a series of ridges 84 on its inner wall to prevent the diaphragm from sealing against the wall. Such ridges, however, stop short of the opening 83a as shown.

Extending upwardly through the frame 82 is a pilot valve plunger 90 which is received in an opening 91. At the upper end of the plunger 90 an opening 92 is provided in the flange portion of the diaphragm. The frame 82 is, in addition, channeled out to provide a vent or passage 93. For the purpose of urging the valve plunger into the closed position, a float lever 94 is provided which is pivoted at 95 and connected at its outer end to a float 96. In order to provide clearance with respect to the valve assembly, the float lever 94 is provided with a large central opening 97.

In operation, the float lever 94 normally occupies the position shown in Fig. 12, in which the water level is normal and in which the pilot valve plunger 90 is urged upwardly to close the pilot valve. Lowering of the water level relieves the pressure on the pilot valve plunger and causes the pressure space 87 to be vented through the channel 93. This releases the pressure in the pressure space and the pressure of the water at the inlet causes radial expansion of the diaphragm and escape of water downwardly along the inlet tube 80, the escaping water passing through the annular space 98 between the valve frame and the inlet line for discharge below water level in the tank and resulting replenishment of the water. The ridges 84 not only serve to insure free communication of water along the under side of the valve cap, but also rigidify the structure. When the water has risen to the desired level, the pilot valve plunger 90 is forced upwardly, thereby sealing off the opening 92 and causing a build-up of pressure in the space 87. A central opening 83a is provided at the center of the diaphragm, just as in the case of the embodiments described above. Continued build-up of the pressure in the pressure space 87 causes the diaphragm snugly to embrace the upper end of the supply line, thereby cutting off further flow of water through the valve.

Since the entire valve is located above the maximum water level, and since an opening 100 is provided for admission of air, it will be apparent in Fig. 12 that syphoning cannot take place when the water supply pressure becomes negative.

In order to refill the closet, a closet refill tube 99 is connected to the outlet 98, as shown in the fragmentary section, Fig. 14, the refilling taking place as a result of the back pressure, as in the case of the earlier embodiments.

What I claim is:

1. In a fluid control valve, the combination comprising a valve body, a source of pressure fluid, a main valve seat, a one-piece flexible diaphragm mounted in said valve body and having normal sealing engagement with said valve seat for shutting off the flow of pressure fluid, said valve body providing a pressure chamber on the opposite side of said diaphragm from said valve seat, said one-piece diaphragm comprising a central boss and an opening of small diameter extending through said diaphragm and boss so that pressure fluid from said source may enter said chamber for exerting a seating pressure on said diaphragm, said boss extending from said diaphragm in a direction away from said seat and said boss cooperating with a wall of said chamber to limit the total excursion of said diaphragm when moving from its seat, said boss comprising a ball and an integrally formed recessed guide forming a continuation of said opening for centering the ball for captive movement relative to said opening thereby to prevent reverse flow of fluid through the diaphragm, said valve body having a passage for venting said pressure chamber, a seat on said passage exterior of said chamber, a valve member for normally sealing off said passage at said seat on said passage and for venting said chamber for causing unseating of the diaphragm and discharge of pressure fluid from said valve.

2. In a fluid control valve, the combination comprising a valve body, a source of pressure fluid, an annular valve seat, means surrounding said seat for providing an annular escape passage immediately adjacent thereto, a one-piece flexible diaphragm mounted in said valve body and having normal sealing engagement with said valve seat for shutting off the flow of pressure fluid through said escape passage, said flexible diaphragm being supported in part upon said means when said diaphragm is closed on said annular valve seat, said valve body providing a pressure chamber on the opposite side of said diaphragm from said valve seat, said one-piece diaphragm comprising a central boss, said diaphragm and boss having an opening of small diameter therethrough so that pressure fluid from said source may enter said chamber for exerting a seating pressure on said diaphragm, said central boss cooperating with a wall of said chamber so as to limit the total excursion of said diaphragm when moving from its seat, a ball-type check valve in said central boss opening for preventing reverse flow of fluid through said opening, a valve passage in said valve body for venting said pressure chamber, a seat formed on said passage exterior of said chamber, and a valve member for normally sealing off said passage and for venting said chamber for causing unseating of the diaphragm and discharge of pressure fluid from said valve.

References Cited in the file of this patent

UNITED STATES PATENTS

| | | |
|---|---|---|
| 398,841 | Mayer | Mar. 5, 1889 |
| 894,734 | Haas | July 28, 1908 |
| 1,269,721 | Kuntny | June 18, 1918 |
| 2,087,049 | Stanley | July 13, 1937 |
| 2,143,204 | McCormack | Jan. 10, 1939 |
| 2,213,753 | Teahen | Sept. 3, 1940 |
| 2,228,552 | Arbogast | Jan. 14, 1941 |
| 2,294,092 | Moody | Aug. 25, 1942 |
| 2,318,236 | Layton | May 4, 1943 |
| 2,329,337 | Criss | Sept. 14, 1943 |
| 2,480,712 | Carbon | Aug. 30, 1949 |
| 2,491,521 | Samiran | Dec. 20, 1949 |
| 2,588,242 | Hunter | Mar. 4, 1952 |
| 2,608,991 | Crockett | Sept. 2, 1952 |
| 2,693,814 | Richards | Nov. 9, 1954 |